Nov. 17, 1970 J. M. KRESOCK ET AL 3,541,235

KEYING CIRCUIT

Filed Oct. 31, 1967

INVENTORS
JOHN M. KRESOCK
THOMAS W. BURRUS
BY William H. Meagher
ATTORNEY

United States Patent Office 3,541,235
Patented Nov. 17, 1970

3,541,235
KEYING CIRCUIT

John M. Kresock and Thomas W. Burrus, Indianapolis, Ind., assignors to RCA Corporation, a corporation of Delaware Filed Oct. 31, 1967, Ser. No. 679,345
Int. Cl. H04n 9/46
U.S. Cl. 178—5.4 4 Claims

ABSTRACT OF THE DISCLOSURE

Keying pulses are applied to the emitter-base junction of a transistor amplifier via a diode, and signals to be keyed are applied to the base.

Figure 1:
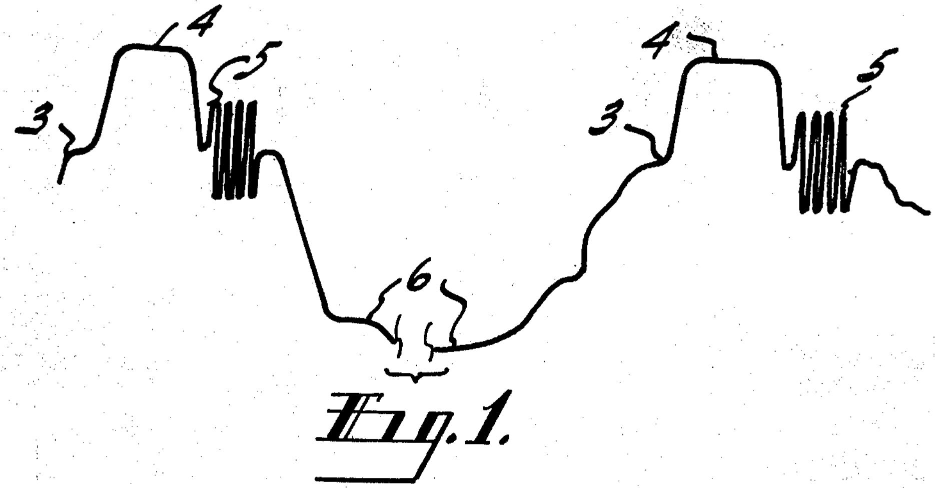

This invention relates to a circuit for separating the color reference bursts from other signal components of the total chrominance signal.

In the color television system presently approved by the Federal Communications Commission of the U.S.A., the chrominance information is transmitted in the form of sidebands of a subcarrier that are superimposed on the luminance signal at the upper portion of its frequency range. The subcarrier itself is suppressed and is represented by bursts of several cycles of a known phase of the subcarrier frequency which occur just after the line synchronizing pulses. In color television receivers for this system, the bursts are separated from the rest of the composite signal and are applied to means for developing or controlling a continuous wave of subcarrier frequency for use in demodulating the chrominance information.

It has been customary in separating the bursts to apply the detected composite video signal to a bandpass amplifier that amplifies only those frequencies in the upper portion of video frequency range in which the burst and chrominance signal frequencies lie. The output of the bandpass amplifier is applied to an amplifier that is biased beyond cutoff. Suitably timed keying pulses are derived from line frequency flyback pulses produced by the line deflection transformer and are applied to the amplifier so as to overcome the cut-off bias and permit it to conduct only when the bursts are present.

The flyback pulses, and therefore the keying pulses derived from them, are generally followed by a series of damped oscillations that occur during the line scanning interval. When a vacuum tube is used as the keyed amplifier, these oscillations have no adverse effect, but when a transistor is used, and the keying pulses are applied across the base-emitter junction, the oscillations can create a Zener condition of the base-emitter junction which overloads the bandpass amplifier and causes it to produce vertical striations of improper color in the picture. Whereas this action can be avoided by the application of the keying pulses to the collector electrode, it requires that they have such a high amplitude as to run the risk of interferring with the operation of other circuits in the receivers. Also, obtaining proper keying action when the collector is keyed is more difficult.

Accordingly, it is an object of this invention to provide an improved burst keying circuit utilizing a transistor as the keyed amplifier in which the possibility of the occurrence of Zener action is avoided even when keying pulses and their associated damped oscillations are applied across the emitter-base junction.

When the keying pulses are applied across the base-emitter junction, variations in their amplitude, which can normally be expected, can change the gain of the amplifier and hence the amplitude of the separated color synchronizing bursts it provides to such a degree as to upset the operation of the color synchronizing circuits to which these bursts are applied.

It is, therefore, another object of the invention to provide an improved burst keying circuit utilizing a transistor as the keyed amplifier in such manner that variations in the amplitude of the keying pulses have little or no effect on the gain of the amplifier.

Keying pulses derived from flyback pulses have rounded crests which can cause an undesired variation in the amplitude of the cycles within each of the separated bursts.

Another object of this invention is, therefore, to provide a keying circuit utilizing a transistor as the keyed amplifier in which the cycles within the separated bursts have the same amplitude.

The burst keying amplifier circuit of this invention has an additional advantage in that the impedance between the base electrode and ground is sufficiently low to prevent what is known as thermal run-a-way.

These objects may be attained in accordance with this invention by applying the chrominance signals to the base electrode of a transistor, applying the keying pulses to the emitter electrode, inserting a unilateral conducting device that is polarized so as to pass current in the same direction as the emitter-base junction in series with the junction, and providing an output circuit for the amplified, separated bursts at the collector electrode.

Figure 2:
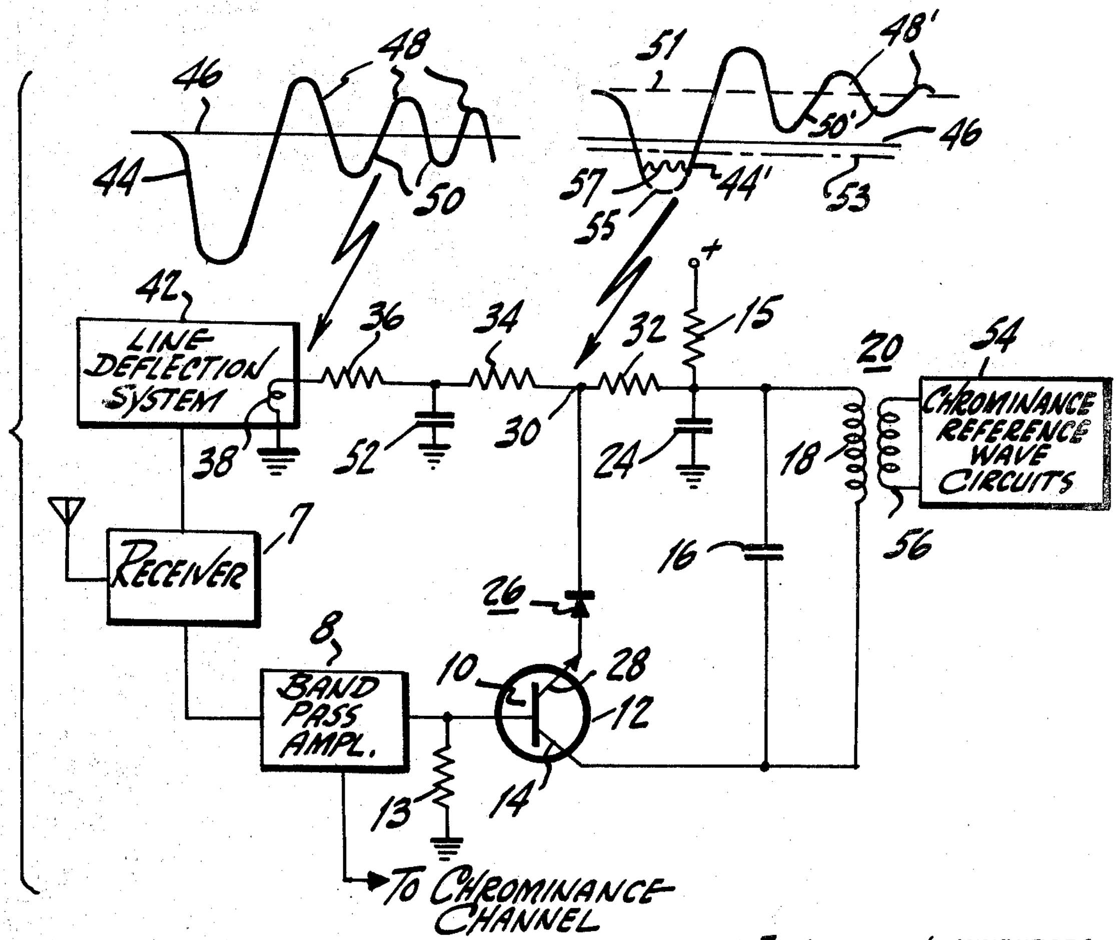

The manner in which this invention achieves the objectives set forth above will be discussed below in connection with the drawings in which:

FIG. 1 is a graphical representation of a color television composite video signal; and FIG. 2 is a schematic diagram of a circuit embodying the invention.

The composite color television video signal diagrammatically illustrated in FIG. 1 includes blanking pedestals 3 with line synchronizing pulses 4 superimposed thereon, the line synchronizing pulses 4 being followed by bursts 5 of a few cycles of a particular phase of the color subcarrier frequency. Between the blanking pedestals 3 are image signals 6, which in color television include a luminance signal and a chrominance signal in the form of sidebands of a suppressed color subcarrier wave. These sidebands lie in a band of frequencies within the upper range of the frequencies allotted to the luminance signal.

In the circuit of FIG. 2, a receiver 7 provides a composite video signal to a band pass amplifier 8, and its output is applied to a base electrode 10 of a keyed NPN transistor 12. A resistor 13 is connected between ground and the base electrode 10.

Positive operating voltage for the collector electrode 14 is supplied from a point of positive potential via a resistor 15 and a parallel circuit comprised of a capacitor 16 and a primary winding 18 of an output transformer 20. An A.C. ground for the frequency of the cycles within the color synchronizing bursts is provided by a capacitor 24.

The transistor 12 is prevented from conducting by connection of a diode 26 between its emitter electrode 28 and a point 30 of positive voltage, which in the particular circuit is the junction between resistors 32 and 34 that are connected in series with a resistor 36 between the ungrounded end of a flyback winding 38 and the junction between the resistor 15 and capacitor 24.

Keying the transistor 12 into conduction when the bursts are present at the base 10 is accomplished in the following way. The flyback winding 38 provides flyback pulses 44 that are negative with respect to ground, indicated by the line 46. As previously noted, each flyback pulse 44 is followed by damped oscillations of less amplitude, the positive half cycles being indicated at 48 and the negative half cycles at 50. A capacitor 52 coacts with the resistor 36 to shift the phase of the flyback pulses 44 so that they are in time coincidence with the color synchronzing bursts 5. The resistors 32, 34 and 36 form a voltage divider, which is grounded at one end by the capacitor 24 for the frequencies in the wave 44, 48 and 50, so that the wave is attenuated at the junction 30. The resulting voltage at the junction 30 is as indicated at 44', 48' and 50', the dashed line 51 representing the positive D.C. voltage produced at the junction in a manner previously explained. Forward bias, necessary for conduction, is applied to the junction between the emitter 28 and base 10 when the keying pulse 44' goes negative with respect to ground by an amount equal to the sum of the contact potentials of the base-emitter junction and the diode 26, the potential being represented by the dotted line 53. If the keying pulse 44' had the same shape as the flyback pulse 44, it would be rounded as indicated by the dotted line 55, but instead it is nearly flat, as indicated at 57 because of the degenerative action of the resistors 34 and 36. The bursts applied to the base electrode 10 modulate the emitter-to-collector current so as to produce a ripple on the flat portion of the keying pulse 44'.

Variations in the amplitude of the flyback pulses 44 do not produce any appreciable variations in the gain of the amplifier 12 for the following reasons. The D.C. voltage of the base 10 remains constant owing to the fact that the base draws very little current and the resistance of the resistor 13 is very low. As previously explained, the resistors 34 and 36 provide degenerative action so that changes in the amplitude of the flyback pulses 44 causing corresponding changes do not produce any appreciable variations in the gain of the amplifier 12 for the following reasons. The D.C. voltage of the base 10 remains constant owing to the fact that the base draws very little current and the resistance of the resistor 13 is very low. As previously explained, the resistors 34 and 36 provide degenerative action so that changes in the amplitude of the flyback pulses 44 cause corresponding changes in the current flowing between the emitter 28 and the collector 14 without significantly altering the voltage of the emitter 28. These changes in current do not significantly alter the voltage of the collector 14 owing to the fact that the changes in collector current and hence voltage of transistor 12 are substantially smaller then the current through the voltage divider comprising resistors 32, 34 and 36. Furthermore, the various operating potentials are selected so that the operation is at a point where changes in collector current do not have much effect on the gain of the amplifier.

If the positive voltage at the crests of the positive half cycles 48' were applied directly to te emitter 28, Zener action of the base-emitter junction might well occur in the transistor 12, so as to overload the band bass amplifier 8 and attenuate the chrominance signals it supplies to the chrominance channel. However, with the diode 26 of sufficiently high reverse breakdown characteristic in the circuit, the positive voltage is not applied to the emitter 28 because of the open circuit provided by the diode 26, and therefore, the possibility of Zener action is avoided.

The resistance value of the resistor 34 is made sufficiently high to prevent undue loading of the source 8 of chrominance signals during the bursts and also to control, through degenerative action, the degree of amplification in the transistor 12. Some degeneration is desirable because if the amplification is too great, the amplitude of the burst energy that is coupled from the collector 14 to the base 10 via the interelectrode capacitance therebetween can alter the phase of the burst at the collector 14. Selection of the value of the resistor 32 depends on the amount of back bias required for the diode 26.

The diode 26 could also be placed in series with the lead for the base 10, but in view of the fact that most diodes exhibit a lower impedance as the current through them increases, it is preferable, in order to decrease the voltage drop across it that the diode 26 be inserted in series with the emitter lead, as shown, because the emitter current of a transistor is greater than the base current. Furthermore, its inclusion in the base circuit would undesirably increase the impedance between the base 10 and ground.

The circuit arrangement described permits the use of a very low value for the base resistor 13, thus minimizing the possibility of thermal run-a-way.

Although other values of circuit components could be used, the following have been found to yield satisfactory results.

Capacitor 16—10 pf.
Capacitor 24—.22 $\mu$f.
Capacitor 52—.01 $\mu$f.
Diode 26—FD222
Resistor 13—250 ohms
Resistor 15—15K ohms
Resistor 32—18K ohms
Resistor 34—56 ohms
Resistor 36—560 ohms
Transistor 12—40345
Voltage at top of resistor 15—150 v.

It will be apparent that variations can be made in the circuit of FIG. 2 without departing from the scope of the invention. For example, a PNP transistor could be used, in which event the polarity of the keying pulse 44' would be reversed, the potential supplied to the resistor 15 would be negative, and the polarity of the connection of the diode 34 would be reversed.

Whereas it is convenient to utilize the same point of potential to supply the back bias for the diode 26 and the operating potential for the collector electrode 14, it is apparent that separate supplies could be used, thus eliminating the connection between the resistor 32 and the resistor 15. Instead, the resistor 32 could be connected to a different source of potential. Of course, a capacitor having a low impedance for the frequency components of the keying pulses 44' would have to be connected across the source of potential.

In the above described manner the bursts which are separated by the action of the circuit described are coupled to one primary 18 of transformer 20 as the primary is connected between the collector 14 of transistor 12 and the junction between resistor 15 and capacitor 24. The primary 18 is paralled tuned approximately to 3.58 mHz. by capacitor 15, which in the case of color television standards is the approximate color burst frequency. The 3.58 mHz. bursts coupled via transformer 20 to the secondary winding 56 where they are directed to the chrominance reference wave circuit 54. Here they may be used to control the phase and frequency of a continuous wave 3.58 $\mu$Z oscillator used in conjunction with the chrominance demodulating circuitry.

What is claimed is:

1. A circuit for separating and amplifing bursts of a color reference signal from a received composite color television video signal having line synchronizing pulses and including bursts of a color reference signal, comprising in combination:

a NPN transistor having a base, collector and emitter electrodes, a source of video signals including said bursts of color reference signal, means for coupling said source between said base electrode and a point of reference potential, a source of keying pulses that are negative with respect to said reference potential and in synchronism with said line synchronizing pulses, an integrating circuit comprised of a first resistor and a first capacitor connected in series in the order named between said source of keying pulses and said point of reference potential so as to cause said keying pulses to be in time coincidence with said bursts of color reference signal, a diode having a cathode and an anode, a D.C. connection between said anode of said diode and said emitter of said transistor, a second resistor connected between the junction of the resistor and capacitor of said integrating circuit and said cathode of said diode, a source of positive D.C. potential, third and fourth resistors connected in series between said latter source and said cathode of said diode, a second capacitor connected between the junction of said third and fourth resistors and a point of said reference potential, said second capacitor having a low impedance for the frequencies contained in said burst and in said keying pulses, and a third capacitor and an inductor connected to form a parallel circuit between the junction of said third and fourth resistors and said collector electrode, said third capacitor and said inductor being resonant at the center frequency of the bursts.

2. In a color television receiver of the type including an amplifier for chrominance signals and a deflection circuit for providing a keying pulse undesirably followed by damped oscillations; a burst separator circuit comprising:

a transistor having base, emitter and collector electrodes and having a predetermined reverse voltage breakdown characteristic between said base and emitter electrode, means coupling said amplifier to said transistor so that said chrominance signal is applied between said base and emitter electrodes, biasing means for normally maintaining said transistor cut-off, means including a rectifier for applying said keying pulse between said base and emitter electrodes, said rectifier being poled to conduct current in the same direction for easy current flow as said base and emitter current path, said keying pulse applied between said base and emitter electrodes in a polarity to render said transistor conductive, the reverse breakdown characteristics of said diode being of a value to prevent excursions of said damped oscillations exceeding said predetermined breakdown characteristics between said base and emitter electrodes, from causing said base and emitter electrodes from conducting in the Zener mode.

3. In a color television receiver, including circuitry for processing a composite television signal containing luminance, chrominance and synchronization signal information including an oscillatory burst signal indicative of the frequency of a color subcarrier frequency utilized at the transmitter, said receiver including a bandpass amplifier for amplifying said chrominance signal information, and a burst separator circuit coupled to said bandpass amplifier, and deflection circuitry for providing a keying pulse to said burst separator circuit, said keying pulse being undesirably followed by damped oscillations, said burst separator circuit comprising:

(a) a transistor having a base, emitter and collector electrode, (b) means coupling said base electrode to said bandpass amplifier for applying said chrominance information thereto, (c) a unidirectional current conducting device in series with said emitter electrode and poled with such polarity as to conduct current in the same direction as for easy current flow between said base and emitter electrodes, (d) biasing means coupled to said unidirectional current conducting device for reverse biasing said device and to therefore prevent current flow in said transistor, (e) means coupled to said unidirectional current conducting device responsive to said bipolar keying pulse, for applying the same to said unidirectional current conducting device to cause said device and therefore said transistor to conduct only during the one polarity of said bipolar pulse of an amplitude sufficient to overcome said reverse bias, whereby said transistor cannot conduct for any of said oscillatory signals contained in said keying pulse of said opposite polarity.

4. The burst separator amplifier according to claim 3 wherein, (a) said transistor has a Zener breakdown rating between said emitter and base electrodes of a magnitude sufficient to cause Zener conduction for said other polarity of said bipolar pulse and which polarity is in a direction to reverse bias said unidirectional current conducting device.

References Cited

UNITED STATES PATENTS

| | | |
|---|---|---|
| 2,976,350 | 3/1961 | Richman. |
| 3,248,478 | 4/1966 | Breimer. |

ROBERT L. GRIFFIN, Examiner

A. H. EDDLEMAN, Assistant Examiner